United States Patent

Kaufman et al.

[15] 3,694,856

[45] Oct. 3, 1972

[54] METHOD OF DEFEATHERING POULTRY

[72] Inventors: Vern F. Kaufman, Lafayette; Alvin A. Klose, Albany; Morris F. Pool, El Cerrito, all of Calif.

[73] Assignee: The United States of America as represented by the Secretary of Agriculture

[22] Filed: Oct. 30, 1970

[21] Appl. No.: 85,786

[52] U.S. Cl. ................................17/47, 17/11.2
[51] Int. Cl. ..............................................A22c 21/04
[58] Field of Search ................17/11, 11.2, 47, 15

[56] References Cited

UNITED STATES PATENTS

| | | |
|---|---|---|
| 2,152,082 | 3/1939 | Onorato et al. ................17/11 |
| 2,806,792 | 9/1957 | Cameron ....................17/47 X |
| 3,074,103 | 1/1963 | Roth et al. ......................17/47 |
| 3,320,632 | 5/1967 | Oehring.....................17/15 X |
| 3,561,040 | 2/1971 | Floden.......................17/11.2 |

*Primary Examiner*—Lucie H. Laudenslager
*Attorney*—R. Hoffman and W. Takacs

[57] ABSTRACT

Procedure for defeathering poultry wherein the feathers are first loosened by an essentially dry treatment, namely, by contacting the poultry carcasses with steam under subatmospheric pressure. The loosened feathers are then removed by subjecting the carcasses to the action of rotating drums provided with rubber fingers.

5 Claims, No Drawings

METHOD OF DEFEATHERING POULTRY

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of new and improved methods for defeathering poultry. Further objects of the invention will be evident from the following description. The abbreviation "psia." used herein means pounds per square inch absolute.

In preparing poultry for the market the customary procedure involves slaughter of the birds, bleeding, immersion of the carcasses in a tank of hot water to loosen the feathers, and removal of the feathers with the usual rubber-fingered poultry pickers.

Although immersion of the poultry carcasses in hot water as a means of loosening the feathers is customary practice, it is subject to certain inherent disadvantages. In the first place, the procedure is unsanitary. The immersion of the carcasses in the hot water bath causes the bath to become loaded with microorganisms, fecal matter, and filth of all kinds. This dirty water can and does actually enter into the body cavities through the available openings and thus enter the pulmonary system and the air sac system which extends throughout the body and also in the bones. As a result, the carcasses become internally contaminated with organisms which cause spoilage and shorten shelf life. Also, potentially pathogenic organisms may invade the interior of the bird in this manner.

Another problem is that the hot water scalding treatment results in the formation of large quantities of water loaded with organic matter. The disposal of this waste liquor presents a serious problem. If discharged directly into a stream it causes pollution of the water course; if discharged into existing sewage treatment plants it causes overloading of the treatment facilities. Because of the present emphasis by federal, state, and local governments on pollution control, poultry processors who rely on the procedure in question are facing a crisis—they must devise a disposal system which not only meets anti-pollution standards, but also which does the job economically so they can stay in business. A failure to meet these criteria means that the operations must be shut down.

In accordance with the invention, the feathers are loosened by an essentially dry procedure, namely, by contacting the poultry carcasses with steam under subatmospheric pressure. This procedure provides substantial advantages over the customary hot water scalding method. A primary advantage is that the unsanitary aspects of the hot water system are completely eliminated. In accordance with the present system, there is no water bath or any other equivalent medium which can have the effect of causing contaminating materials to contact or invade the interior parts of the poultry. Another advantage of the invention is that the feather loosening is accomplished in an essentially dry manner; no water will drain from the subatmospheric steam-treated carcasses so that the waste water disposal problem is eliminated or at least greatly minimized.

It is further to be emphasized that the subatmospheric steam treatment of the invention accomplishes the desired result of loosening the feathers so that they can subsequently be picked without skin damage. Also, application of the process of the invention does not hinder the usual production system used in the poultry dressing factory in that establishment of the present system merely entails substitution of a subatmospheric steam treatment device for the conventional hot water tanks.

The apparatus for conducting the subatmospheric steam treatment may take various forms. For batch-type operations, one may employ a tank provided with steam and vacuum line connections and with a door which may be opened to admit (and remove) poultry carcasses and closed to maintain the tank in a sealed condition so that its interior may be evacuated and invested with steam under subatmospheric pressure. For continuous operations, one may provide a chamber which is connected to vacuum and steam lines and which is provided with suitable means for introducing and withdrawing the poultry carcasses without materially affecting the low pressure conditions existing in the chamber. The blanching device of U.S. Pat. No. 2,403,871 may, for example, be adapted to provide such a system. To this end there is provided a long tubular chamber which is maintained at subatmospheric pressure and supplied with steam under such conditions, and which is provided with a series of pistons which can slide snugly through the chamber. These pistons are interconnected by chains or the like to form, in the aggregate, a conveyor which carries the carcasses through the chamber with the individual pistons acting as sealing means to prevent loss of vacuum within the chamber.

In applying the feather-loosening treatment in accordance with the invention, the poultry carcasses are subjected to steam at a temperature about from 130° to 140° F., and at a corresponding pressure about from 2.2 to 2.9 psia. The carcasses are exposed to the subatmospheric steam for the time required to loosen the feathers, this generally being about ½ to 3 minutes. For best results we prefer to maintain a flow of steam through the scalding chamber wherein the carcasses are contained. This is readily achieved by admitting steam into the chamber while concomitantly continuing the exhaustion of the chamber under such conditions that the desired pressure and temperature are maintained as aforesaid. This procedure has the benefit that air and other non-condensible gases are swept out of the system whereby these gases cannot interfere with the desired uniform and rapid feather loosening effect.

After the carcasses have been subjected to the subatmospheric steam treatment, they are treated to remove the loosened feathers, namely, by subjecting them to the action of one or more rotating drums provided with rubber fingers, such devices generally being termed poultry pickers or pluckers. Generally, we prefer to defeather the carcasses in two stages--first dry (or with a very limited amount of water, i.e., enough to dampen the carcasses) to remove the major portion of the feathers, then with a spray of water to remove the few remaining feathers. This procedure has the advantage that most of the feathers are received in a relatively dry condition so that they can be easily handled and further processed as by treating with steam under pressure to convert them into a meal useful as a fertilizer and animal feed. Moreover, since there is no water drainage from these feathers, the pollution load of the waste waters of the plant is greatly reduced.

The process of the invention is applicable to poultry of all kinds as, for example, chickens, turkeys, ducks, geese, etc.

A critical feature of the invention is that steam is applied under subatmospheric pressure. In this manner we establish a medium which (a) is at the proper temperature for feather loosening and (b) has a minimum content of air or other extraneous gas. The significance of the latter is explained as follows: Prior hereto it has been advocated that feather loosening be accomplished at atmospheric pressure by contacting the carcasses with steam diluted with air to form a gaseous mixture having a temperature suitable for feather loosening. This procedure, however, does not provide satisfactory results. In particular, feather removal is not uniform over the surface of the birds. This undesirable result is believed to be due to the large proportion of air in the gaseous mixture. Although this air is warm, it has little value as a heat exchange medium because only a change in sensible heat is involved. In sum, the air acts as a hindrance to the good heating ability of the steam in the gas mixture. In contrast, in accordance with the invention the desired reduction in temperature from the normal temperature of steam (212° F.) is attained by reduction in pressure rather than dilution with air. Consequently, our medium can transfer heat to the feathers and surface portions of the birds effectively and rapidly, with the end result that complete defeathering is attained within a short time of treatment and without damage to the poultry carcasses.

The invention is further demonstrated by the following illustrative examples.

EXAMPLE 1

The steam treatments referred to below were carried out in a tank connected to vacuum and steam lines through conventional valves, and provided with a lid which could be opened to insert or remove poultry carcasses and closed to maintain the tank in a vacuum-tight condition. A thermometer and pressure gauge were also provided for measuring the conditions within the tank.

In carrying out the steam treatment, poultry carcasses were placed in the tank and the lid was sealed. The tank was then evacuated and steam was injected. During each run a small flow of steam through the tank was maintained while continuing operation of the vacuum system to maintain the pressure and temperature at predetermined levels (as indicated below). After a period of time (also indicated below), the vacuum in the tank was broken, the lid opened, and the carcasses removed. The steam-treated carcasses were then subjected to defeathering by one pass (30 seconds) through a picker (cyclic, free-floating, rubber fingered) with application of just sufficient water to dampen the feathers. In this first pass the major portion of the feathers were removed. The carcasses were then subjected to a second pass (20 seconds) through the same picker but this time the birds were sprayed with water as they were being picked. In this second pass the small portion of remaining feathers were removed. After picking, the carcasses were examined for appearance and presence of residual feathers.

In these runs the procedure as described above was applied to carcasses of hen turkeys 20–24 weeks old. The conditions applied and the results obtained are summarized below:

| Run | Steam treatment conditions | | | Evaluation of product |
|---|---|---|---|---|
| | Temp. °F. | Pressure psia | Time, min. | |
| A | 140 | 2.9 | 2 | Clean and uniform appearance; feather removal complete; no residual pinfeathers |
| B | 140 | 2.9 | 1 | do. |
| C | 135 | 2.54 | 1 | Clean and uniform appearance; feather removal complete; 1 to 4 pinfeathers remaining per bird |
| D | 130 | 2.2 | 2 | do. |

EXAMPLE 2

In these runs the carcasses were those of frying chickens. In two of the runs (E and F), the procedure of the invention as described in Example 1 was applied. For purpose of comparison, several runs (G–J) not in accordance with the invention were carried out. In these runs the steam treatment was at atmospheric pressure by employing a mixture of steam and air. The conditions used and the results obtained are summarized below:

| Run | Steam treatment conditions | | Time, min. | Evaluation of product |
|---|---|---|---|---|
| | Temp., °F. | Pressure, psia. | | |
| E | 140 | 2.9 | 2 | Clean and uniform appearance; feather removal complete |
| F | 130 | 2.2 | 3 | do. |
| G | 155–160 | 14.7 | 3 | Incomplete feather removal; birds retained most of their back feathers |
| H | 150–155 | 14.7 | 2 | Incomplete feather removal; birds retained most of their feathers |
| I | 145–150 | 14.7 | 3 | Incomplete feather removal; many feathers remaining all over the birds |
| J | 143–184 | 14.7 | 3 | do. |

Having thus described the invention, what is claimed is:

1. A method for defeathering poultry which comprises:

a. placing a poultry carcass in a scalding zone wherein the carcass is contacted with steam at a pressure of about from 2.2 to 2.9 psia. and at a temperature about from 130° to 140° F., and continuing said treatment until the feathers are loosened, and b. picking the loosened feathers from the so-treated carcass.

2. The method of claim 1 wherein the scalding zone is maintained essentially free from air during the treatment.

3. The method of claim 1 wherein a flow of steam through the scalding zone is maintained during the treatment to sweep out air and other non-condensible gases.

4. The method of claim 1 wherein the picking operations are carried out in at least two stages, the first stage being essentially a dry operation.

5. A method for defeathering poultry which comprises:
   a. contacting a poultry carcass with a gaseous medium consisting essentially of steam at a pressure about from 2.2 to 2.9 psia. and at a temperature about from 130° to 140° F., and continuing said contact for a period of about ½ to 3 minutes to loosen the feathers on said carcass, and
   b. picking the loosened feathers from the so-treated poultry carcass.

* * * * *